April 21, 1964
R. LEE
3,129,611
SPEED REDUCERS
Filed Oct. 14, 1960
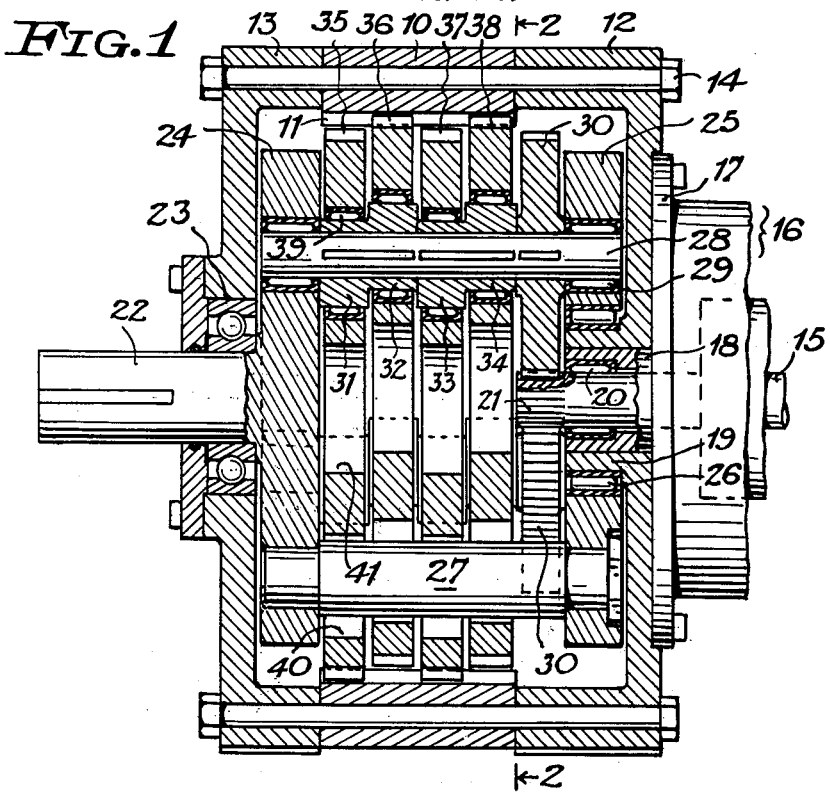
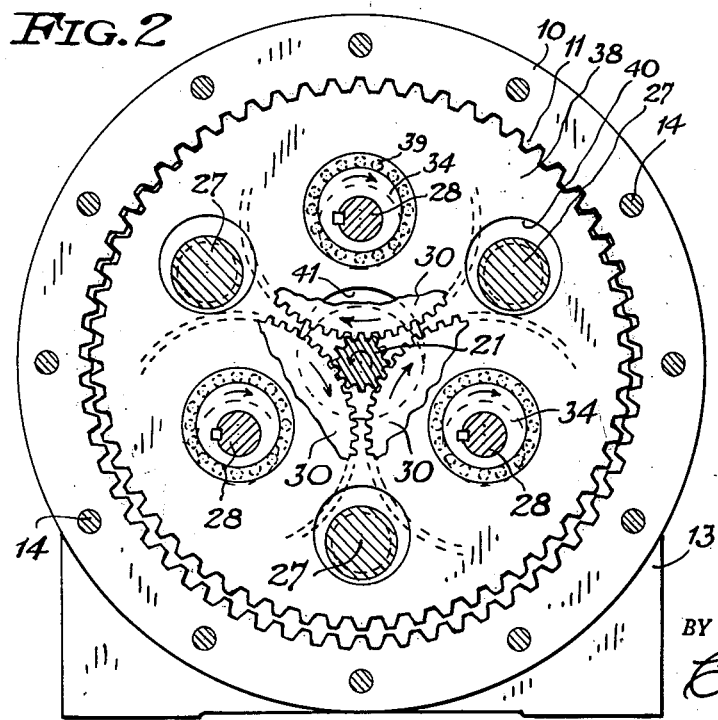
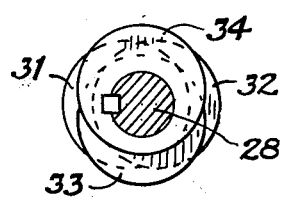
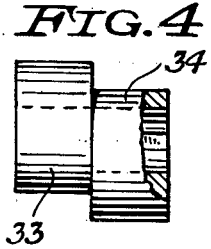
INVENTOR.
ROYAL LEE
BY
Christopher L. Waal
ATTORNEY United States Patent Office 3,129,611
Patented Apr. 21, 1964

3,129,611
SPEED REDUCERS
Royal Lee, Elm Grove, Wis., assignor to Lee Engineering Company, Milwaukee, Wis., a corporation of Wisconsin
Filed Oct. 14, 1960, Ser. No. 62,591
2 Claims. (Cl. 74—804)

This invention relates to speed changing gear transmissions and more particularly to speed reducers of the cycloidal type including an eccentrically driven rolling gear meshing with an internal gear.

An object of the invention is to provide an improved cycloidal-type speed reducer which has a relatively high reduction ratio and which will minimize vibration and efficiently handle heavy loads.

Another object is to provide a gear reducer which will avoid the need for excessively high speeds of the driving eccentrics for the rolling gears.

A further object is to provide a speed reducer which is of compact construction for its load capacity, and which will operate smoothly and reliably over a wide range of speeds.

The invention further consists in the several features hereinafter described.

In the accompanying drawing,

FIG. 1 is a vertical longitudinal sectional view of a speed reducer constructed in accordance with the invention;

FIG. 2 is a transverse sectional view taken generally on the line 2—2 of FIG. 1;

FIG. 3 is an enlarged detail transverse sectional view of one of the eccentric assemblies taken on the same plane as FIG. 2, and FIG. 4 is a side view of one of the eccentric units, parts being shown in section.

In the drawing, 10 designates a ring member having internal radial gear teeth 11 and forming a stationary internal gear. Cupped cover plates 12 and 13 are rigidly secured, as by bolts 14, to opposite ends of the ring member 10 and form therewith a gear housing.

A driving shaft 15, here shown to be the shaft of an electric motor 16, extends through the cover plate 12 coaxially of the ring gear. The motor includes a peripherally flanged frame 17 clamped axially to the cover plate 12 and further includes a frame hub 18 which extends into and fits within an inwardly projecting tubular hub 19 of the cover plate. The shaft 15 is here shown to be journaled in an anti-friction bearing 20 in the motor frame hub 18 and is formed with a pinion 21 within the gear housing.

A driven member or shaft 22 is journaled in the other cover plate 13 coaxially of the drive shaft, as by an anti-friction bearing 23, and is provided within the gear housing with a pair of rigidly connected axially spaced disks 24 and 25, the disk 24 being adjacent to the cover plate 13, and the disk 25 being adjacent to the cover plate 12 and rotatably mounted on the cover plate hub 19 by an anti-friction bearing 26. A rigid connection between the spaced disks 24 and 25 is provided by a plurality of three strong bars or struts 27 fixedly secured to the disks and extending parallel to the coaxial driving and driven shafts, the bars 27 being equally spaced in a circle and forming a rigid cage with the disks. The cover plate hub and motor frame hub are both coaxial with the ring gear and driven member.

At points about midway between the cage bars 27 a plurality of three equally spaced eccentric-carrying shafts 28 extend between the disks 24 and 25 in parallel relation to the driving shaft axis and are journaled in the disks by anti-friction bearings 29. Adjacent to the disk or ring 25 the three shafts 28 carry respective spur gears 30 of identical construction which mesh with the motor shaft pinion 21 for synchronously driving the three shafts 28 in the same direction at a speed which is substantially lower than that of the motor shaft. The motor shaft pinion 21 and gears 30 thus provide a substantial initial speed reduction which by way of example may be about 5:1.

Each cage-supported shaft 28 carries a plurality of identical eccentrics 31, 32, 33, and 34 which are rigidly keyed on the shaft and which cooperate with respective identical planet or pinion gears 35, 36, 37, and 38, hereinafter more fully described, having a rolling meshing engagement with the internal gear 10. Each rolling pinion gear is mounted on the three associated driving eccentrics by anti-friction bearings 39, such as needle bearings. To facilitate assembly and balance of the pinion gears, the four eccentrics on each of the shafts 28 are arranged in double units, one being shown in FIG. 4, the two eccentrics on each unit being angularly spaced 180°. The two tandem eccentric units may be angularly spaced in various arrangements. For convenience in illustration each pair of laterally adjacent eccentrics are shown to be spaced 180° in FIG. 1. A preferred arrangement is indicated in FIG. 3 wherein the two double eccentric units are spaced 90°. In another possible arrangement, one of the double eccentric units is shifted 180° from the position shown in FIG. 1. In each arrangement the three eccentrics for each pinion gear are disposed in phase, or have the same orientation.

The rolling pinion gears have eccentrically disposed clearance openings 40 through which the cage bars 27 pass, and also have central openings 41 to reduce weight, although the latter openings may be omitted, it being noted that there are no centrally disposed eccentrics. It will be seen that the two pinion gears carried on each double eccentric unit mesh with the internal gear at points 180° apart. The diameter of each planet or pinion gear is slightly smaller than that of the internal gear, and there is preferably a tooth difference of one between these gears.

In operation, the motor shaft 15, which may be rotated in either direction, drives the eccentric-carrying shafts 28 through the speed reducing gearing consisting of the motor shaft pinion 21 and the gears 30, and the rotation of the eccentrics effects a cycloidal rolling motion of the several pinion gears around the stationary internal gear 10. Assuming that the internal gear 10 has 61 teeth and each pinion gear 60 teeth, the rolling pinion gears will rotate in a direction opposite to that of the eccentrics and will complete one full revolution for each 60 eccentric shaft revolutions. The rotation of the pinion gears is transmitted by the shafts 28 to the output or driven shaft 22 which thereby rotates at a relatively low speed.

It will be seen that, by reason of the initial speed reduction, a relatively high overall speed reduction can be obtained without requiring the eccentrics to rotate at the high speed of the driving or input shaft 15, and each rolling pinion gear is rotatably supported and driven by a plurality of angularly spaced eccentrics.

In completing the assembly of the speed reducer, the motor shaft pinion 21 is inserted axially into the opening or bore of the cover plate hub 19 of the assembled gear housing, being guided by the sliding fit of the motor frame hub 18 in the cover plate hub, so as to mesh with the spur gears 30 mounted on the eccentric-carrying shafts 28. The motor frame is then axially clamped to the gear housing cover plate. The driven member cage is rotatably mounted in the gear housing independently of the driving motor, the latter with its driving pinion being readily mountable and demountable as a unit with respect to the housing without disturbing the cage.

I claim:

1. A speed reducer comprising a pair of meshing internal and externally toothed gears having parallel axes and further having a small tooth number difference between them, one of said gears being stationary and the other having a rolling motion about the stationary gear, a rotatable driven member coaxial with the stationary gear, housing means in which said driven member is rotatably mounted, a plurality of driving eccentrics for the movable gear rotatably carried by said driven member to turn about parallel axes spaced from the driven member axis, said eccentrics having the same orientation and being rotatable in the same direction, said eccentrics being journaled in and carrying said movable gear for effecting a rolling travel of said movable gear on said stationary gear, input gearing means for synchronously rotating said eccentrics, said input gearing means including spur gears coaxially coupled to the respective eccentrics and meshing with a smaller driving pinion coaxial with said stationary gear, said housing means including an end cover member adjacent to said spur gears and having an opening coaxial with said driven member, and a frame rotatably carrying said driving pinion, said frame being rigidly but detachably secured to said cover member and having a projecting part slidably fitting in said opening, and said frame-carried pinion being axially insertable through said end cover opening into meshing engagement with said spur gears and being axially guided into said meshing engagement by the sliding fit of said projecting frame part in said opening.

2. A speed reducer comprising a stationary internal gear, an externally toothed planet gear disposed within and meshing with said internal gear, there being a small tooth number difference between said gears, a rotatable driven member coaxial with said internal gear and including a cage structure with axially spaced supports one of which is of annular shape, housing means enclosing said cage structure and including an end cover member having an inwardly projecting tubular hub coaxial with said driven member and defining an axial opening, axially spaced bearings supporting said driven member including a bearing for said annular support, said last-named bearing being carried on the outer periphery of said tubular hub, a plurality of eccentrics rotatably carried by said cage structure between said supports and having parallel rotational axes equally radially spaced from the axis of the driven member, said eccentrics being journaled in and carrying said planet gear and having the same orientation and being rotatable in the same direction, input gearing means for synchronously rotating said eccentrics to effect a rolling travel of said planet gear on said internal gear, said input gearing means including spur gears coaxially coupled to said respective eccentrics and further including a smaller driving pinion coaxial with said driven member and meshing with said spur gears, and a frame rotatably carrying said driving pinion, said frame being rigidly but detachably secured to said end cover member and including a hub extending axially into the tubular hub of said end cover member and slidably fitting in said tubular hub, and said driving pinion projecting from said frame hub and being axially insertable through the opening of said tubular hub into meshing engagement with said spur gears, said pinion being guided into said meshing engagement by the sliding fit of said frame hub in said tubular hub.

References Cited in the file of this patent

UNITED STATES PATENTS

| | | |
|---|---|---|
| 2,152,005 | Walter | Mar. 28, 1939 |
| 2,369,422 | Williams | Feb. 13, 1945 |
| 2,508,121 | McIver | May 16, 1950 |
| 2,708,851 | Moerk | May 24, 1955 |

FOREIGN PATENTS

| | | |
|---|---|---|
| 1,042,574 | France | June 10, 1953 |